United States Patent [19]
Kozaki et al.

[11] Patent Number: 6,021,130
[45] Date of Patent: *Feb. 1, 2000

[54] ATM SWITCHING SYSTEM AND CELL CONTROL METHOD

[75] Inventors: Takahiko Kozaki, Koganei; Morihito Miyagi, Tokyo; Manabu Okamoto, Yokohama, all of Japan

[73] Assignee: Hitachi, Ltd., Tokyo, Japan

[*] Notice: This patent is subject to a terminal disclaimer.

[21] Appl. No.: 09/094,675

[22] Filed: Jun. 15, 1998

Related U.S. Application Data

[63] Continuation of application No. 08/604,615, Feb. 21, 1996, Pat. No. 5,886,982, which is a continuation of application No. 08/294,496, Aug. 23, 1994, Pat. No. 5,530,698.

[30] Foreign Application Priority Data

Aug. 25, 1993 [JP] Japan ............................. 5-210179

[51] Int. Cl.[7] ........................................... H04J 3/14
[52] U.S. Cl. ................................................. 370/399
[58] Field of Search .................................. 370/229, 230, 370/231, 232, 233, 234, 235, 236, 237, 412, 413, 414, 415, 416, 463, 417

[56] References Cited

U.S. PATENT DOCUMENTS

| | | |
|---|---|---|
| 4,821,258 | 4/1989 | Fraser . |
| 4,920,531 | 4/1990 | Isono et al. . |
| 4,930,122 | 5/1990 | Takahashi et al. . |
| 4,975,906 | 12/1990 | Takiyasu et al. . |
| 5,043,979 | 8/1991 | Sakurai et al. . |
| 5,050,161 | 9/1991 | Golestani . |
| 5,099,475 | 3/1992 | Kozaki et al. . |
| 5,124,977 | 6/1992 | Kozaki et al. . |
| 5,130,984 | 7/1992 | Cisneros . |
| 5,144,622 | 9/1992 | Takiyasu et al. . |
| 5,157,654 | 10/1992 | Cisneros . |
| 5,179,557 | 1/1993 | Kudo . |
| 5,184,346 | 2/1993 | Kozaki et al. . |
| 5,231,633 | 7/1993 | Hluchyj et al. . |

(List continued on next page.)

FOREIGN PATENT DOCUMENTS

| | | |
|---|---|---|
| 2020239 | 3/1991 | Canada . |
| 2065043 | 1/1992 | Canada . |
| 0596200A2 | 11/1994 | European Pat. Off. . |
| WO 92/17014 | 10/1992 | WIPO . |
| WO 93/14605 | 7/1993 | WIPO . |

OTHER PUBLICATIONS

Ramamurthy, A Multidimensional Framework for Congestion Control in B–ISDN, *IEEE Journal on Selected Areas in Communications,* vol. 9., No. 9., Dec. 1991, pp. 1440–1451.

Yin et al, Implication of Dropping Packets from the Front of a Queue,*IEEE Transactions on Communicaitons,* vol. 41., No. 6., Jun. 1993, pp. 846–851.

(List continued on next page.)

*Primary Examiner*—Huy D. Vu
*Attorney, Agent, or Firm*—Antonelli, Terry, Stout & Kraus, LLP

[57] ABSTRACT

An ATM switching system which includes PVC allocation circuits corresponding to output queues. At the time of arrival of the leading cell of each burst data, if the output line has room, the PVC of the burst data is stored as information for admission and identification. The subsequently-arriving cells having the same PVC identification information as the stored identification information are input to an output buffer, and the cells of the remaining burst data are all discarded. Even when a plurality of burst data compete for the same output line, the fact that all the cells other than the first-arriving admitted burst data are discarded prevents the cells from being input other than within a predetermined bandwidth and localizes the burst data affected by the cell discarding due to output queue overflow.

7 Claims, 13 Drawing Sheets

U.S. PATENT DOCUMENTS

| | | |
|---|---|---|
| 5,276,681 | 1/1994 | Tobagi et al. . |
| 5,280,475 | 1/1994 | Yanagi et al. . |
| 5,301,333 | 4/1994 | Lee . |
| 5,357,506 | 10/1994 | Sugawara . |
| 5,404,354 | 4/1995 | Hayter et al. . |
| 5,416,769 | 5/1995 | Karol . |
| 5,426,640 | 6/1995 | Hluchyj et al. . |
| 5,448,559 | 9/1995 | Hayter et al. ............................ 370/416 |
| 5,457,687 | 10/1995 | Newman .................................. 370/236 |
| 5,513,177 | 4/1996 | Sakurai et al. . |
| 5,528,763 | 6/1996 | Serpanos . |
| 5,530,698 | 6/1996 | Kozaki et al. . |

OTHER PUBLICATIONS

Golestani, A Framing Strategy for Congestion Management, *IEEE Journal on Selected Areas in Communications*, vol. 9., No. 7., Sep. 1991, pp. 1064–1077.

Dejean et al, String Mode–A New Concept for Performance Improvement of ATM Networks, *IEEE Journal on Selected Areas in Communications*, vol. 9, No. 9 Dec. 9, 1991, pp. 1452–1460.

Boyer et al, A Reservation Principle with Applications to the ATM Traffic Control, Computer Networks and ISDN System 24 (1992) pp. 321–334.

Trancher et al, Fast Bandwidth Allocation in ATM Networks, ISS '92, Oct. 1992, vol. 2, pp. 7–11.

Wernik et al, Traffic Management for B–ISDN Services, *IEEE Network*, Sep. 1992, pp. 10–19.

*Technical Report of IEICE*, "Control Method of Shared Buffer Type ATM Switch", T. Kozaki, et al., The Institute of Electronics, Information and Communication Engineers.

"Dynamic Call Admission Control in ATM Networks", by Saito, et al., Sep. 1991, pp. 982–989.

Hui, Resource Allocation for Broadband Networks, *IEEE Journal on Selected Areas in Communications*, vol. 6, No. 9, Dec. 1988, pp. 1598–1608.

ATM SWITCHING SYSTEM AND CELL CONTROL METHOD

This is a continuation of application Ser. No. 08/604,615, filed Feb. 21, 1996 now U.S. Pat. No. 5,866,982; which is a continuation of application Ser. No. 08/294,496, filed Aug. 23, 1994, now U.S. Pat. No. 5,530,698.

CROSS-REFERENCE TO RELATED APPLICATION

The application relates to U.S. application Ser. No. 07/845,668 filed on Mar. 4, 1992 now U.S. Pat. No. 5,365,519 entitled "ATM Cell Switching System" by T. KOSAKI et al.

BACKGROUND OF THE INVENTION

The present invention relates to an ATM switching system used for the broadband ISDN, or more in particular to an ATM switching system suitably used for burst data communication service carried out in Permanent Virtual Connection (PVC) mode.

The communication service of the broadband ISDN is either of two modes; Switch Virtual Connection (SVC) and PVC.

In SVC mode, (Virtual Path Identifier (VPI)/Virtual Channel Identifier (VCI) is assigned to a call in the ATM switching system at the time of setting (connecting) the particular call to establish a routing path while at the same time securing a bandwidth of the particular call. As a result, in SVC mode, the amount of incoming cells for each output line of the ATM switch is accommodated in a predetermined bandwidth, and therefore the storage capacity of the output cell buffer provided for each output line can be comparatively small.

In PVC mode, by contrast, VPI/VCI is assigned fixedly between specific communication terminals so that the terminal equipment can communicate on a dedicated line whenever required. When the communication is in PVC mode, the bandwidth is not secured for the VPI/VCI unlike in the ATM switching system in SVC mode. In the case where a plurality of burst data in PVC mode directed to the same output line are applied at the same time to the ATM switch, therefore, excessive ATM cells beyond the bandwidth of the output line flow into the buffer memory associated with the output line, and the excess cells beyond the buffer capacity are unavoidably discarded.

The cell discarding can be avoided by two methods. In a method, a sufficient buffer capacity is provided to accommodate a plurality of burst data generated for the same output port. The other method is such that the required bandwidth is secured in each system on the data route each time before transmission of the burst data from the PVC mode terminal.

The burst data produced from the RAM or the hard disc of the terminal equipment may amount to as large as 1 Mbits to 1 Gbits. The method in which a buffer capacity sufficient to accommodate a plurality of burst data is secured in the ATM switch involves a vast amount of buffer memory capacity, and therefore is not of practical value from the viewpoint of memory utilization.

In the method in which a bandwidth is secured each time of burst data transmission in PVC mode, by contrast, the time required for securing the bandwidth is not negligible, and the problem is posed of a reduced communication efficiency of the terminal equipment.

Assuming that an ATM switching system is employed in which control information including call control and bandwidth control are gathered in a processor and various control operations are performed in compliance with commands from the processor. In the case where a broadband ISDN is configured which is capable of transferring data of about 10 Mbits at the bit rate of 150 Mb/s within 100 ms, for example, the time required for securing a bandwidth exceeds the time required for data transfer, so that the overhead time for securing a bandwidth may pose a bottleneck to the burst data communication. This overhead time can be reduced to some degree by improving the processor capacity. This improvement based on the processor capacity, however, has its own limit.

There have been proposed various conventional techniques, such as U.S. Pat. No. 5,124,977 and U.S. Pat. No. 5,184,346 both related to a switching system using a common buffer memory, U.S. Pat. No. 5,099,475 related to a switching system in which a high speed line is connected to the input and output links of an ATM switch through a cell multiplexer or cell demultiplexer, and U.S. Pat. No. 5,280,475 related to traffic shaping method and circuit in which a list structure is formed at every virtual path in a common buffer memory to control the reading of cells by a band control table.

SUMMARY OF THE INVENTION

An object of the invention is to provide an ATM switching system and an ATM cell control method which are improved in a way suitable for burst data communication.

Another object of the invention is to provide an ATM switching system and an ATM cell control method in which a buffer memory of comparatively small capacity can be used for each output line, and the burst data in PVC mode can be communicated efficiently.

In order to achieve the above-mentioned objects, according to the invention, there are provided an ATM switching system and an ATM cell control method, wherein in the case where a plurality of burst data directed to the same output line flow into the switching system in a temporally overlapped fashion. Only those cells associated with one or a plurality of burst data specified with the arrival of the leading cell thereof are admitted, while the cells belonging to the other burst data are discarded.

Cell admission or discarding is determined in the following manner. All the cells associated with burst data with the leading cell thereof arriving when the bandwidth of the output line has room are admitted, whereas the cells of burst data with the leading cell thereof arriving when there is no room in the bandwidth are all discarded.

More specifically, in the system according to the invention, state information is stored indicating the state of use of the output bandwidth of each output line or the use thereof by other burst data. At the time point of arrival of the leading cell of each burst data, part of the header information of the leading cell is registered as identification information for admitted burst data and the leading cell of the admitted burst data is stored temporarily in a buffer memory, if the transmission of the particular burst data can be permitted according to the state information. In the case where the bandwidth of the output line is in a state that cannot permit transmission of the burst data at the time point of arrival of the leading cell, on the other hand, the particular leading cell is discarded.

When a cell other than the leading cell of a burst data has arrived, a decision is made as to whether it should be admitted or discarded according to whether the header of the cell contains the burst identification information registered as described above. The registration of the identification information of an admitted burst data is cancelled when the last cell of the particular burst data is processed.

The identification information used for an admitted burst data include the identification information contained in the header of the leading cell of the burst data, such as VCI (Virtual Channel Identifier), VPI (Virtual Path Identifier), a combined value of VPI and VCI, part of VPI, part of VCI or part of the combined value of VPI and VCI.

According to one aspect of the invention, in the case where a plurality of burst data directed to the same output port have arrived in temporally overlapped fashion, whether the burst data is admitted or not is determined at the time of arrival of the leading cell of the burst data. When a burst data is rejected, the subsequently-arriving cells of the particular burst data are all discarded, while all the cells of an admitted burst data arriving subsequently are admitted. As a result, the cell discarding operation caused by congestion is prevented from affecting all the burst data, thereby reducing the number of burst data which are required to be retransmitted due to the cell discarding.

According to another aspect of the invention, all the subsequently-arriving cells of a burst data which is rejected are discarded, and therefore the capacity of the buffer memory required for temporarily storing the output cells for each output line can be reduced.

The foregoing and other objects, advantages, manner of operation and novel features of the present invention will be understood from the following detailed description when read in conjunction with the accompanying drawings.

DESCRIPTION OF THE PREFERRED EMBODIMENTS

Figure 1:
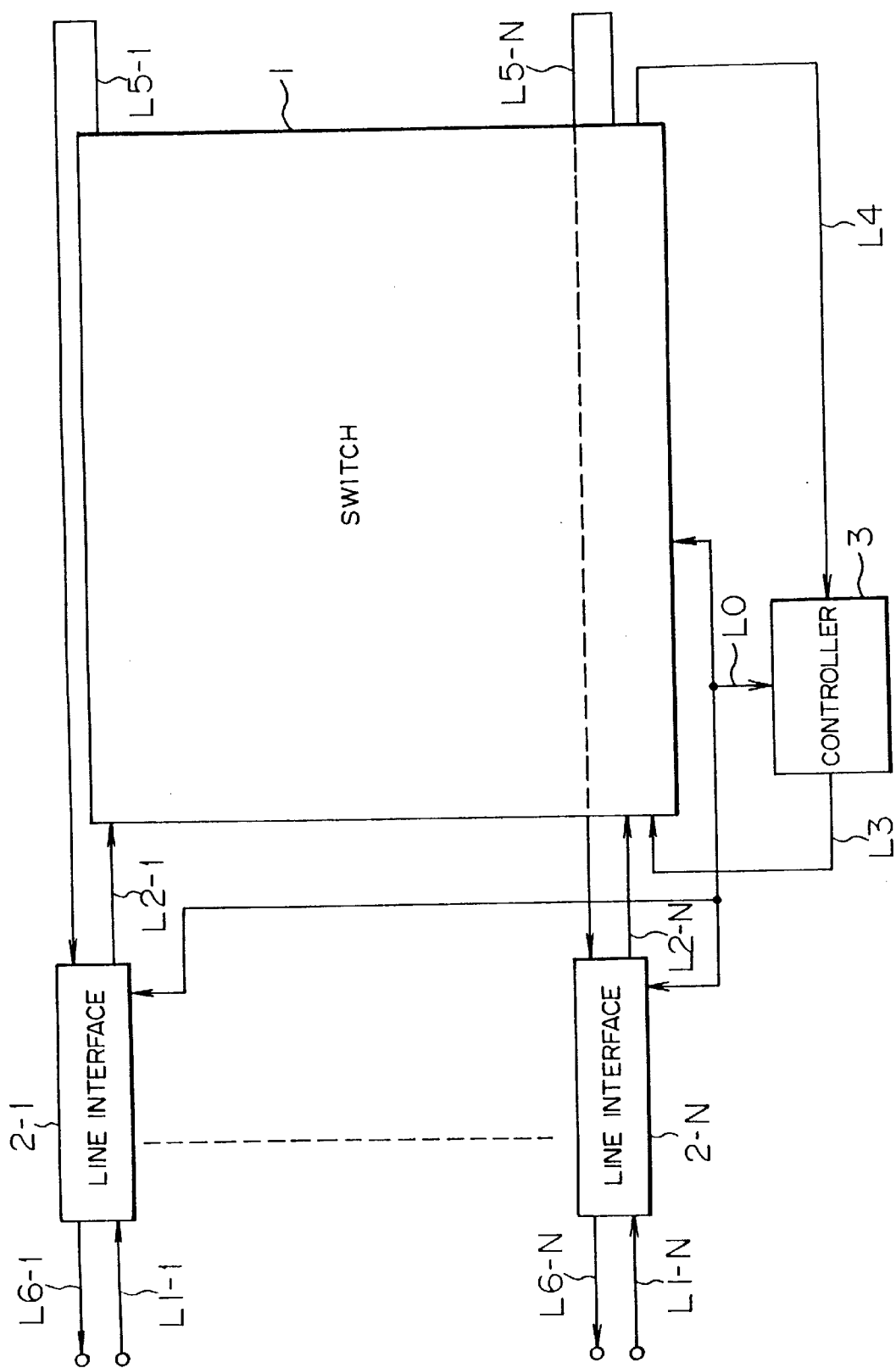
FIG. 1 is a diagram showing an example of the general configuration of an ATM switching system according to the present invention.

FIG. 1 shows an example of the general configuration of an ATM switching system or an ATM exchanger according to the invention.

In FIG. 1, reference character L1-$i$ ($i$=1 to N) designates input lines, and L6-$i$ ($i$=1 to N) output lines. These lines transfer fixed-length packets (ATM cells) in the form of optical or electrical signal. The lines L1-$i$ and L6-$i$ are paired to make up a subscriber line (or a trunk line connected to another switching system) connected to terminal equipment. Numeral 1 designates a switch, numeral 2-$i$ ($i$=1 to N) a channel interface provided for each subscriber line, and numeral 3 a controller connected to the switch 1 through lines L3 and L4 on the one hand and to each line interface and the switch 1 through a control bus LO on the other hand.

The cells input from the input lines L1-1 to L1-N are subjected to such processes as opto-electrical conversion, transmission frame termination, cell synchronization according to the system configuration, header conversion and addition of the routing information added as required by the switch 1 at the channel interfaces 2-1 to 2-N respectively.

The cells input from the line interface 2-$i$ to the switch 1 through line L2-$i$ are distributed among the lines L5-1 to L5-N and L4 according to the routing information added to the respective headers. The cells output to the lines L5-1 to L5-N, after being subjected to the processes including cell synchronization, transmission frame termination and electro-optical conversion at the line interfaces 2-1 to 2-N, are output to output lines L6-1 to L6-N respectively.

The switch 1 distributes cells for call process control or network management (hereinafter referred to as the control cells) to the line L4 and transfers them to the controller 3.

The controller 3 controls the switch 1 and the line interfaces 2-1 to 2-N through a control bus LO, while at the same time collecting information on these elements through the control bus LO. The control circuit 3 generates cells including control information to be transmitted to the terminal equipment connected to the subscriber line or other ATM switching systems and output it to the line L3. These cells are distributed to the lines L5-1 to L5-N by the switch 1, and transferred through the line interfaces to the destination terminal equipment or another ATM switching system.

Figure 2:
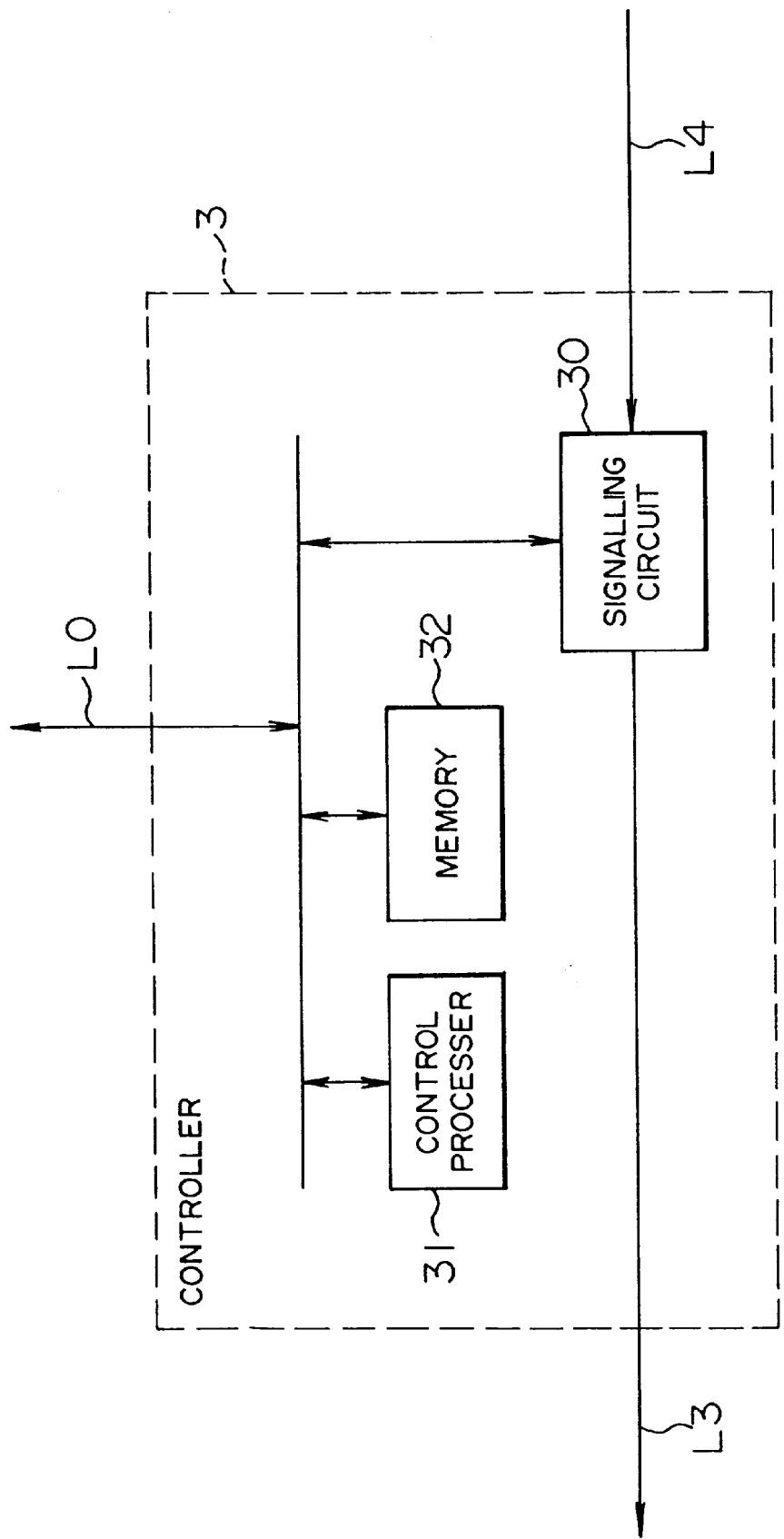
FIG. 2 is a diagram showing the controller for an ATM switching system shown in FIG. 1 according to an embodiment of the invention.

FIG. 2 shows the controller 3 according to an embodiment.

The controller 3 includes a signalling circuit 30, a control processor 31 and a memory 32.

The control cells input from the line L4 are assembled into a message at the signalling circuit 30 and applied through the control bus LO to the control processor 31.

The control processor 31 decodes the contents of the message received from the signalling circuit 30, stores necessary information in the memory 32, and issues an instruction to the control bus LO for controlling the switch 1 and the line interfaces 2-1 to 2-N as required.

Also, the message including the control information destined for another ATM switching system or terminal equipment generated at the control processor 31 is separated into cells at the signalling circuit 30 and output to the line L3.

Figure 3:
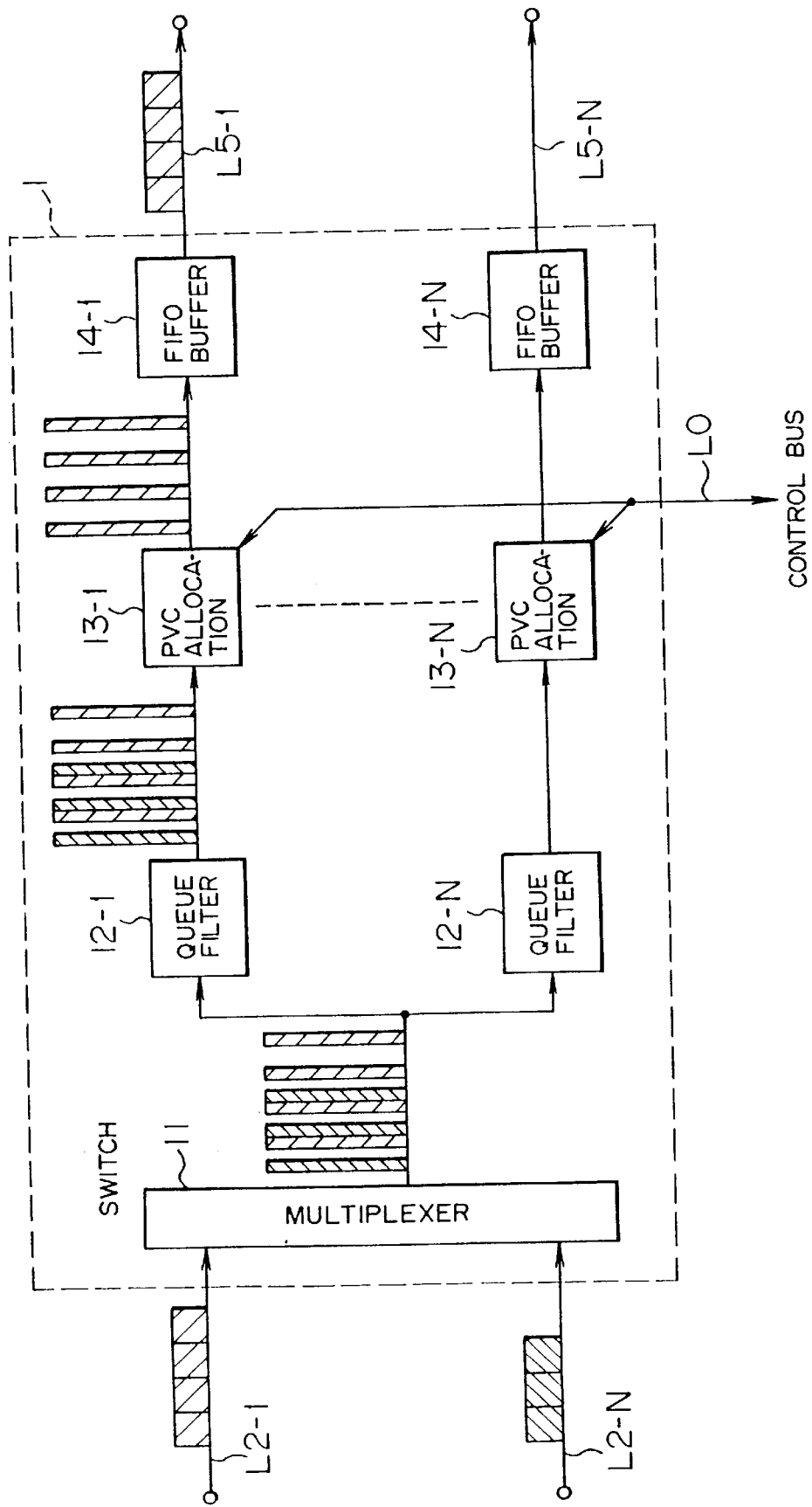
FIG. 3 is a diagram showing an ATM switch having the function of PVC allocation according to an embodiment.

FIG. 3 is a diagram for explaining the basic configuration and operation of the ATM switch according to the invention.

The ATM switch 1 includes a multiplexer 1, a plurality of queue filters 12-$i$ ($i$=1 to N), PVC allocation circuits 13-$i$ ($i$=1 to N) and FIFO buffers 14-$i$ ($i$=1 to N) associated with the output lines (lines L5-1 to L5-N) respectively.

Cells input in parallel from the lines L2-1 to L2-N are converted into a serial string of cells at the multiplexer 11, and then applied to the queue filters 12-$i$ to 12-N in parallel.

Each queue filter 12-$i$ decides whether the cell input thereto is the one to be output to the output line L5-$i$ corresponding to the particular queue filter on the basis of the routing information of the input cell, and applies only the cells to be so output to the PVC allocation circuit 13-*i* selectively.

The PVC allocation circuits 13-*i* perform burst cell control operation corresponding to the valid bandwidth of the output lines described later, and supply the input cells selectively to the FIFO buffers 14-*i*.

The cells stored in the FIFO buffers 14-*i* are read out to the output lines L5-*i* in accordance with the output line speed.

The switch 1 is capable of accommodating two types of services including SVC (Switched Virtual Connection) mode and PVC (Permanent Virtual Connection) mode.

The SVC mode is for securing the bandwidth on the output line L5-*i* of the switch 1 at the time of call connection and sets a call in such a manner as not to exceed the bandwidth of the particular output line. In this case, even if cells are input concentratively to the same output port from a plurality of ones of the input lines L2-1 to L2-N, it is a temporary phenomenon. The bandwidth, therefore, does not exceed the channel speed of the output lines L5-1 to L5-N. As a result, as far as the capacity of the FIFO buffers 14-1 to 14-N is sufficient, the probability that the cells overflow the buffer is reduced considerably, thereby eliminating the need of adjustment of cell flow rate by the PVC allocation circuits 13-1 to 13-N.

The PVC mode, on the other hand, is a communication service suitable for transferring burst data which are generated more frequently and sporadically than in the circuit switching. In PVC mode, in order to prevent the frequency of call control and time waste of call controller calls are normally fixedly assigned to the transmit and receive terminals. In this way, the call control by the controller 3 is conserved at the time of burst data transmission. The PVC mode assumes the fact that transmission of each burst data is instantaneous and that a plurality of burst data transmissions rarely compete on the same line. The bandwidth allocation to the output lines corresponding to calls is therefore omitted.

The problem of the PVC service is that as shown in FIG. 3, for example, in the case where burst data are input in temporally overlapped fashion from a plurality of input lines L2-1 to L2-N, i.e., in the case where a plurality of continuous cell strings are directed toward the same output line, say, L5-1, the amount of cells input to the FIFO buffer 14-1 of the output line exceeds the output bandwidth.

Generally, the capacity of the FIFO buffers 14-1 to 14-N is designed on the assumption that the amount of cells applied thereto is within the bandwidth of the respective output lines. The FIFO buffers 14-1 to 14-N, therefore, are not always capable of accommodating the amount of cells beyond the bandwidth flowing in continuously for a predetermined period of time as when a plurality of burst data are generated concurrently as mentioned above.

When cells exceeding the output bandwidth flow in, the FIFO buffers are filled up so that subsequently-arriving cells overflow the buffers and are discarded. In the process, all the burst data have part of subsequently-arriving cells thereof discarded, and therefore all of a plurality of competing burst data remain incomplete making retransmission inevitable.

In view of the above-mentioned phenomenon, according to the invention, discarding of cells for at least one of the competing burst data is avoided to permit data transfer in complete form. For this purpose, the invention includes PVC allocation circuits 13-*i* (i=1 to N) for selectively controlling the cell input to the FIFO buffers.

According to the invention, with the arrival of the leading cell of burst data in PVC mode, if the output buffer has a sufficient room of bandwidth, the PVC allocation circuit 13 registers the identifier (PVC) of the burst data as identification information of the admitted burst so that the leading cell and the subsequently-arriving burst data cells having the registered identification information are stored (admitted) in the output buffer.

In the event that the bandwidth of the output buffer has no sufficient room at the time of arrival of the leading cell, by contrast the PVC is not registered and the leading cell is discarded (not stored in the buffer), so that the subsequently-arriving burst data cells having unregistered identifiers are also discarded.

According to a simplest embodiment of the invention, assuming that a plurality of burst data compete on the same output line. Each PVC allocation circuit admits only the first burst data to pass through and discard all the cells of subsequently-arriving burst data until the first burst data has passed out. In this case, the PVC registered as admitted burst identification information at the time of arrival of the leading cell of the first burst data is deleted from registration when the last cell of the particular burst data arrives. Until this PVC registration is deleted, PVC of other burst data is not registered. All the cells of the subsequently-arriving burst data having no admitted burst identification information are thus discarded, while the burst data with the leading cell thereof arriving first after PVC deletion is admitted anew.

In the case of FIG. 3, two burst data arrive at the input lines L2-1 and L2-N at the same time. The burst data on line L2-1 whose leading cell arrives earlier, however, acquires the right of way, so that the PVC allocation circuit 13-1 admits the burst data cell on line L2-1 and discards all the burst data cells on the line L2-N.

According to this embodiment, all cells of the first-arriving burst data on line L2-1 are admitted in the FIFO buffer in competition, and the particular burst data is transferred in complete form. Thus the only burst data on line L2-N is required to be retransmitted.

Figure 4:
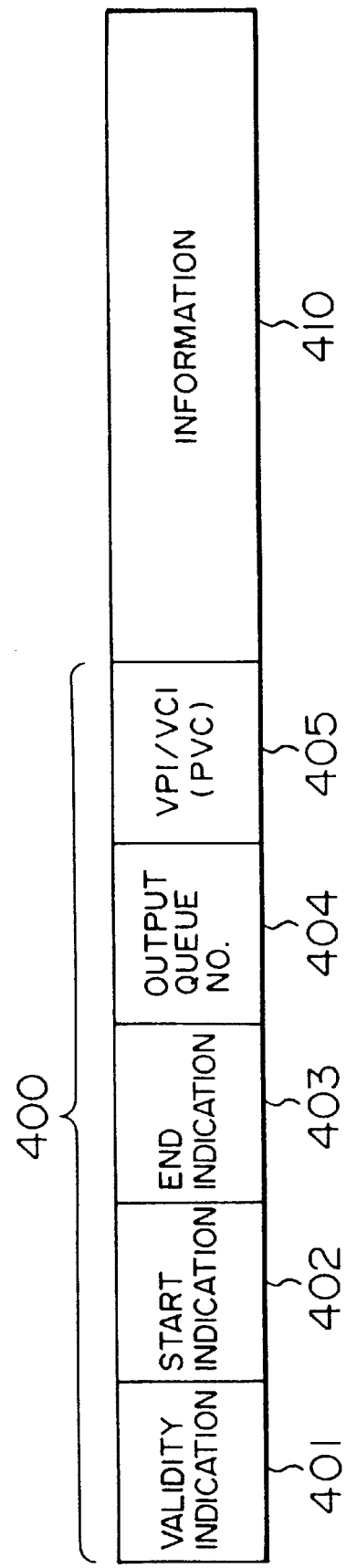
FIG. 4 is a diagram showing an example of the format of the internal cell.

FIG. 4 shows an example of cell format input to the switch of FIG. 3.

The input cell includes a header 400 and an information section 410. The header 400 includes a validity indication field 401 indicating whether the cell is valid or not, a start indication field 402 indicating that the cell is the leading one of the data (burst data), an end indication field 403 indicating that the cell is the last one of the data (burst data), a field 404 indicating the output line (output queue) providing routing information, and a VPI/VCI (PVC) field providing call identification information.

The switch decides which of the queue filters 12-1 to 12-N is to be supplied with the input cell according to the output queue number 404 of the header information of the cell.

In the case where the information indicating the start (leading cell) is set in the field 402, the PVC allocation circuits 13-1 to 13-N store (register) in the associated buffer the PVC value contained in the field 405 of the cell as identification information of the admitted burst data unless the buffer is occupied by other burst data.

The PVC value used for this purpose is the VCI value, the VPI value, an integrated value of VPI and VCI, or part of these values set in the field 405.

In the case where a cell other than the leading cells of the burst data is input, the PVC allocation circuits 13-1 to 13-N decide whether the field 405 of the cell contains the same identification information as the admitted burst data registered at the time of arrival of the leading cell thereof. Only those cells which coincide with the identification information in registration are admitted and the remaining cells are discarded.

With the arrival of a cell containing the end indication (last cell indication) in the field 403, if this cell is the last cell of admitted burst data, the PVC allocation circuits 13-1 to 13-N cancel the registration of the identification information of the admitted burst data and are ready to admit other burst data whose leading cells subsequently arrive in the output buffer.

Figure 5:
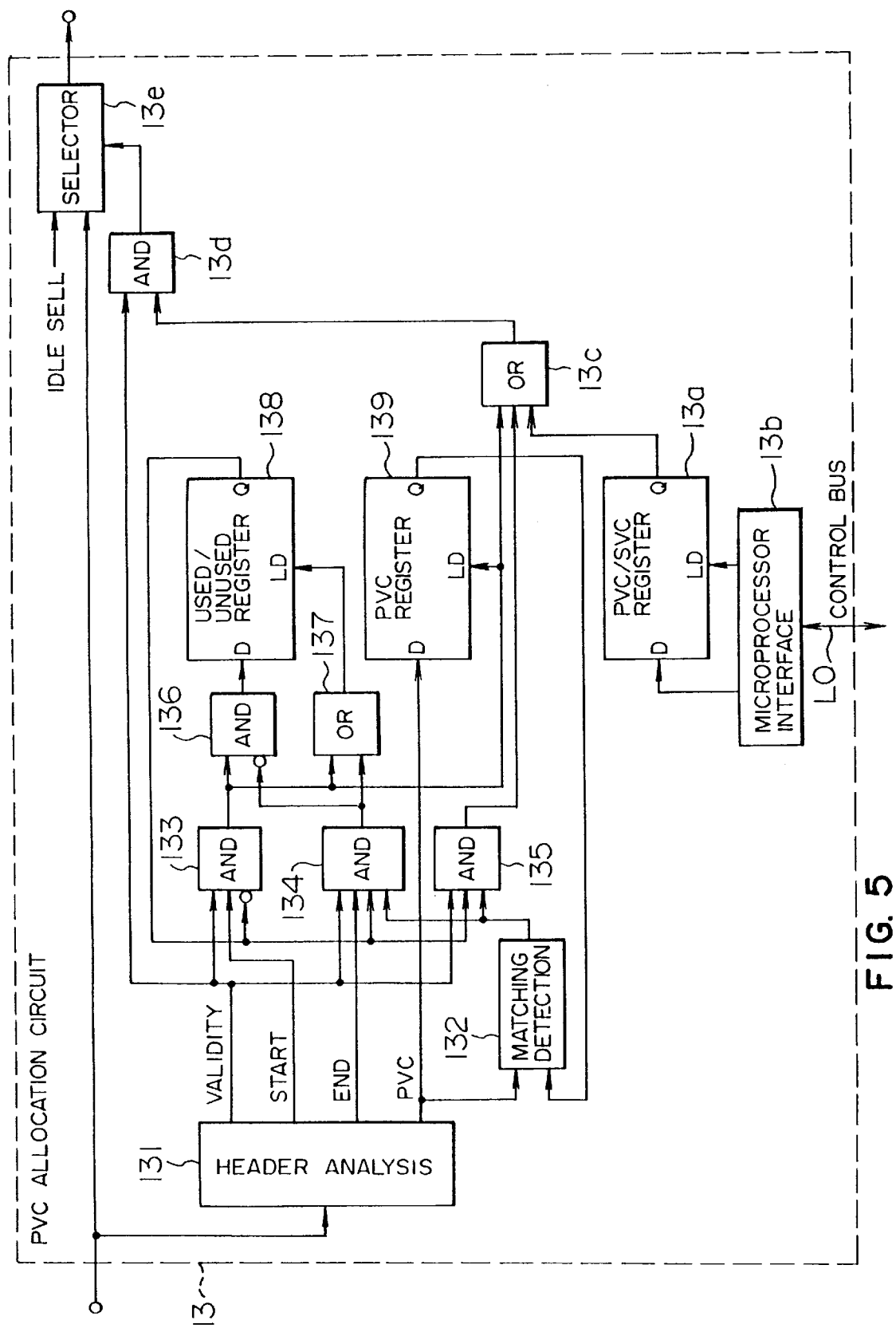
FIG. 5 is a diagram showing a PVC allocation circuit shown in FIG. 3 according to an embodiment.

FIG. 5 is a diagram showing the PVC allocation circuit 13-i according to an embodiment in FIG. 3.

A header analysis circuit 131 separates and outputs the validity indication field 401, the start indication field 402, the end indication field 403 and the PVC field 405 of the input cell.

In the case where the validity indication field contains the value "0" indicating an idle cell, an AND circuit 13d outputs a signal "0" and causes a selector 13e to selectively output an idle cell pattern.

A used/unused register 138 is for storing information as to whether an output line is busy for transmission of burst data (information indicating whether the output line has a room of bandwidth). The PVC register 139 stores the PVC (identification information on the admitted burst data) of the burst data currently using the output line.

The PVC/SVC register 13a indicates whether the queue processed by the PVC allocation circuit is associated with SVC mode or PVC mode.

Assuming that the register is set in SVC mode, the PVC/SVC register 13a outputs a signal "1", causes an OR circuit 13c to output a "1" signal, causes an AND circuit 13d to output a signal "1" when the validity indication field is "1" indicating a valid cell, and causes a selector 13e to pass the input cell, as it is. In this case, the PVC allocation circuit does not manage the burst data but passes cells freely.

In the case where the PVC/SVC register 13a is set in PVC mode, in contrast, the OR circuit 13c does not output a signal "1" unless the output of the AND circuit 133 or 135 is "1". As a result, under this condition, the cell output is controlled by the output of the AND circuit 133 or 135.

The PVC/SVC register 13a is set to a given mode by the controller 3 through a control bus LO and a microcomputer interface circuit 13b.

The PVC/SVC register 13a of each output line is set to SVC mode as initial state, for example, and when PVC service is requested for a specific output line, the associated PVC/SVC register 13a is switched to PVC mode.

Next, detailed explanation will be made about the operation in the case where the PVC/SVC register 13a indicates PVC mode.

When an input cell indicates a leading cell, the used/unused register 138 outputs a signal "0" indicating that it is not busy. When the validity indication field of the input cell is "1" indicating a valid cell, the AND circuit 133 outputs a signal "1".

In the process, on condition that the AND circuit 134 outputs "0" (when the last cell is not involved), the AND circuit 136 outputs "1", and the OR circuit 137 sets the load input LD of the register 138 to "1", thereby setting the used/unused register 138 to "1" indicating that it is busy. Also, the PVC value output from the header analysis circuit 131 is set in the PVC register 139. Further, the output "1" of the AND circuit 133 causes the selector 13e to output an input cell selectively through the OR circuit 13c and the AND circuit 13d. This operation permits the PVC to be registered at the time of arrival of the leading cell of the burst data.

Assuming that when the input cell is in start indication, the used/unused register 138 indicates that the burst data is busy with burst data registration. The output of the used/unused register 138 is "1", and that of the AND circuit 133 "0". Therefore, no value is set in the used/unused register 138. In this case, the input cell is not subjected to selective output control through the OR circuit 13c.

This operation indicates that if the buffer is being used by a previously-arriving burst data at the time of arrival of the leading cell of another burst data, the PVC registration of the second-arriving burst data is impossible.

Assuming that an input cell is the last cell (with the field 403 indicating the presence of end indication). The validity indication field 401 is "1" indicating the presence of a valid cell, and the used/unused register 138 output a signal "1" indicating that it is busy. Also, the AND circuit 134 outputs a signal "1" when a matching detection circuit 132 outputs "1" indicating that the PVC registered in the PVC register 139 coincides with the PVC of the output from the header analysis circuit 131.

Under this condition, the AND circuit 136 outputs a signal "0", and the OR circuit 137 "1". The used/unused register 138 is thus set to "0" indicating the idle state. As a result, the buffer is usable by another new burst data which may arrive.

In the case where an input cell is valid with the used/unused register 138 indicating the busy state and the value of the PVC register 139 coincides with that of the input cell PVC, then the AND circuit 135 outputs "1". The selector 13e is thus caused to selectively output the input cell through the OR circuit 13c and the AND circuit 13d. This control process makes it possible to admit the PVC cell in use which may arrive.

FIG. 3 shows the case in which only one burst data is admitted at a time on a single output line. In the case where the maximum bandwidth of the burst data is 10 Mb/s and the bandwidth of the output line 150 Mb/s, however, 15 burst data can be admitted at a time on a single output line.

Figure 6:
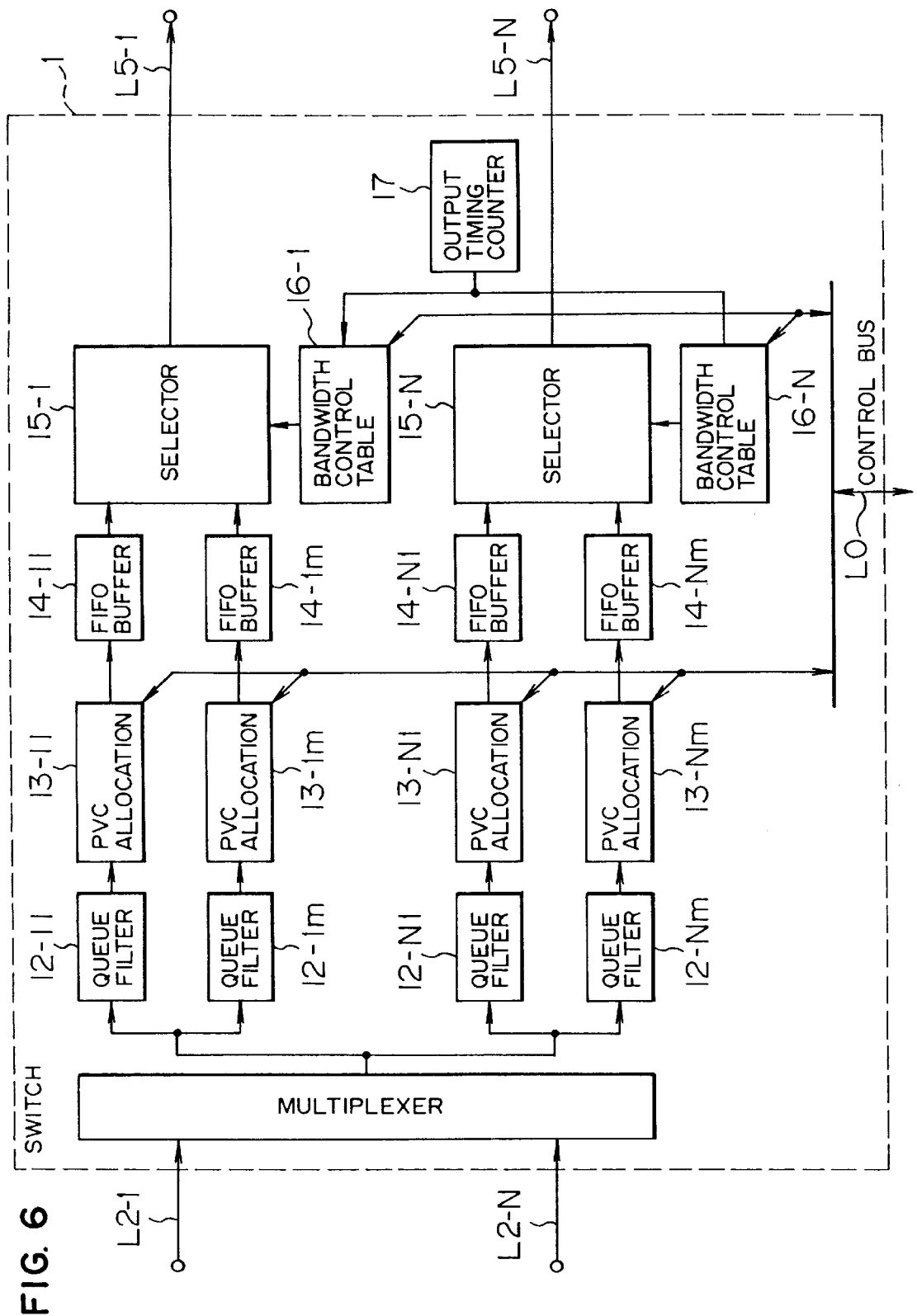
FIG. 6 is a diagram showing an ATM switch having the PVC allocation function according to another embodiment.

FIG. 6 shows an example of the ATM switch configuration in which a plurality of burst data can be admitted on a single output line.

In this example, a single output line such as L15-i is associated with a plurality of queue filters 12-11 to 12-1m, a plurality of PVC allocation circuits 13-11 to 13-1m, a plurality of FIFO buffers 14-11 to 14-1m, a single selector 15-1 and a bandwidth control table 16-1 connected to the selector 15-1.

Each PVC allocation circuit can pass only one burst data at a time. Since a plurality of PVC allocation circuits are available for each output liner however, up to a number m of burst data can be admitted at a time on each output line.

A bandwidth control table 16-1 outputs a queue number (FIFO buffer number) corresponding to the timing signal output from an output timing counter 17, and causes the selector 15-1 to select one of the FIFO buffers 14-11 to 14-1m corresponding to the particular queue number.

In this configuration, assuming that a specified PVC allocation circuit 13-11 alone is set to SVC mode and the other PVC allocation circuits 13-12 to 13-1m to PVC mode. The FIFO buffer 14-11 connected to the specific PVC allocation circuit 13-11 is supplied with cells dedicated for SVC mode. The cells are output in a bandwidth assigned on the bandwidth control table 16-1, and the remaining bandwidth can be assigned to the number m-1 of burst data. In this way, cells for different service calls can be admitted on a single output line.

Although the case of FIG. 6 shows the configuration in which a plurality of physically-separated queues are provided on each output line, the configuration with a multiplicity of queues provided on stand-alone basis is accompanied by a large segmentation loss and is disadvantageous for hardware realization.

Figure 7:
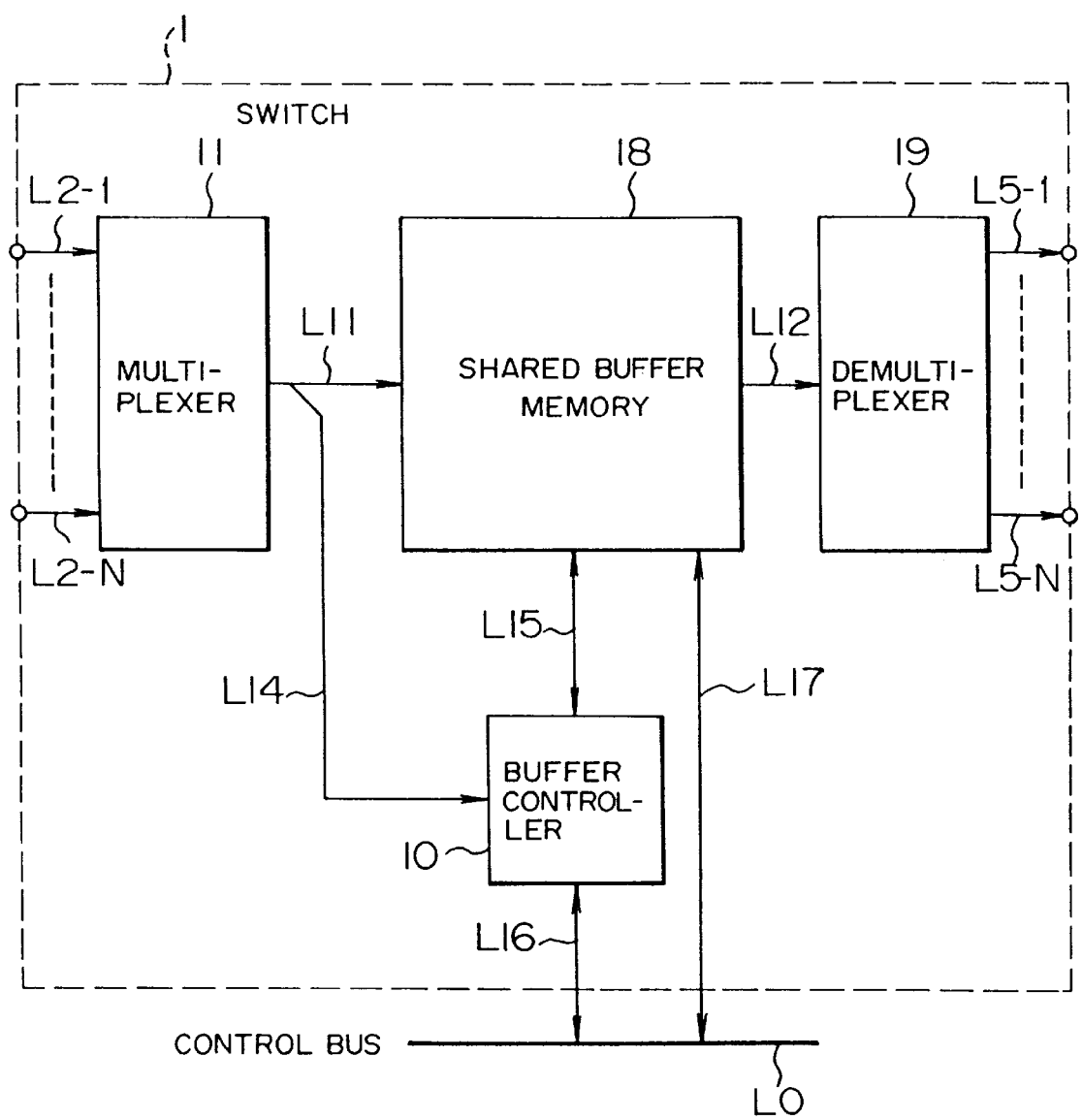
FIG. 7 is a diagram showing an ATM switch having the PVC allocation function according to still another embodiment.
Figure 8:
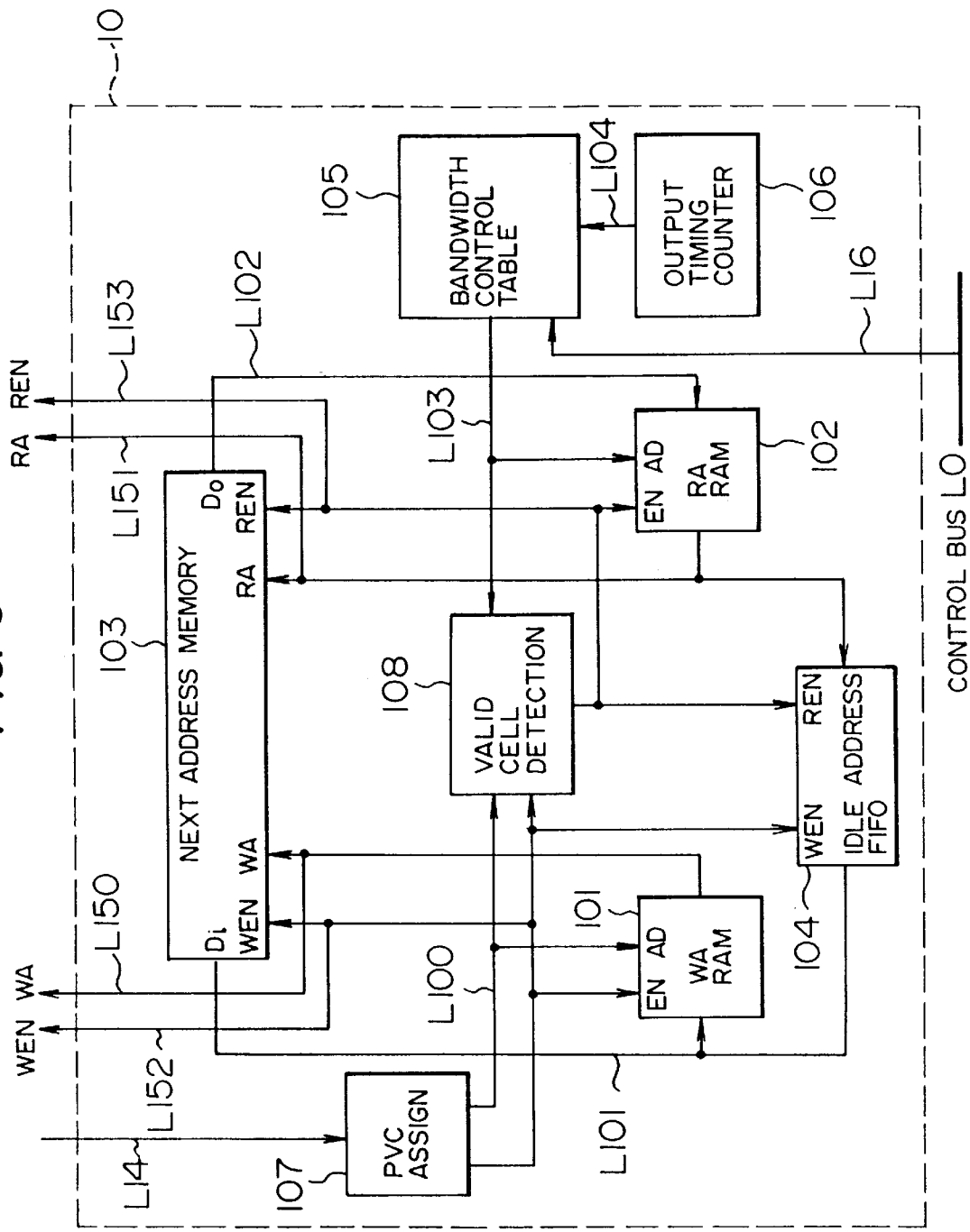
FIG. 8 is a diagram showing the buffer controller shown in FIG. 7 according to an embodiment.
Figure 9:
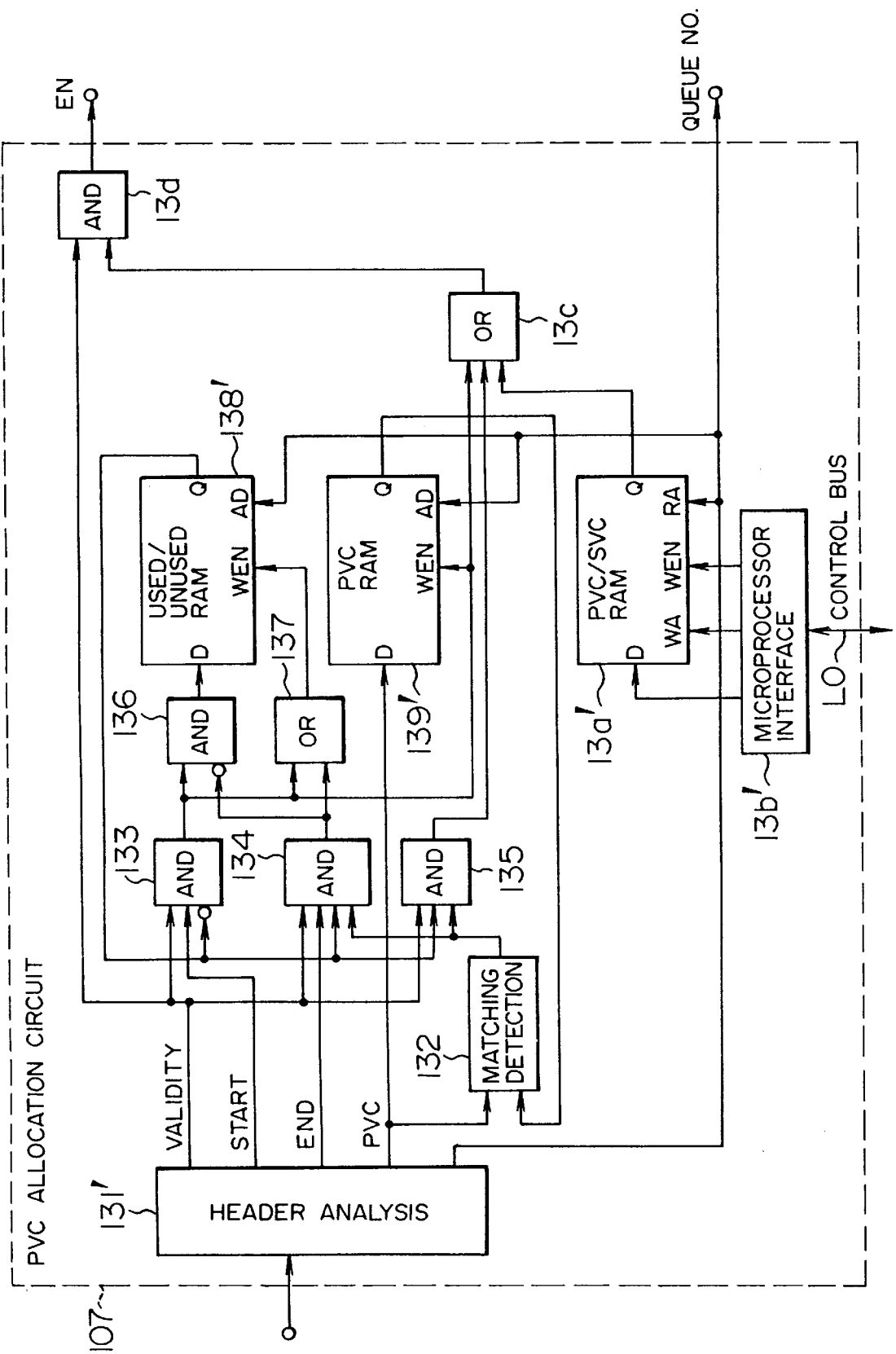
FIG. 9 is a diagram showing the PVC allocation circuit shown in FIG. 8 according to an embodiment.

FIGS. 7 to 9 show an example of the switch configuration with a shared or common buffer which is functionally equivalent to that shown in FIG. 6.

In FIG. 7, the ATM switch comprises a multiplexer 11, a common buffer 18, a demultiplexer 19 and a buffer controller 10.

Cells input in parallel from the input lines L2-1 to L2-N are time-division multiplexed at a multiplexer 11 and input to the common buffer 18 as a serial stream of cells.

The buffer controller 10 analyzes the header of each cell output to a signal line L14 from the multiplexer 11, determines the address of a list structure to which the cell is to be linked, and applies the address as a write address to the common buffer.

Also, the buffer controller 10 gives a read address to the common buffer 18 at a predetermined timing in step with the cell output to the output lines L5-1 to L5-N and reads the cells out of the common buffer 18. The demultiplexer 19 distributes the cells read out of the common buffer 18 among the output lines L5-1 to LS-N periodically.

FIG. 8 is a diagram showing the buffer controller 10 of FIG. 7 according to an embodiment.

The header of an input cell is input to a PVC allocation circuit 107 through line L14. The PVC allocation circuit 107 performs the control operation for registering the identifier (PVC allocation) for an admitted burst data and discarding the cells of the burst data not admitted. The PVC allocation circuit 107 also outputs an output queue number to line L100, and a write enable signal to line L152. As a result, a write address corresponding to the queue number is read from a write address memory (WARAM) 101 and output to line L150.

Numeral 103 designates a next address memory for storing the pointer address (write address or read address) indicating the record (cell data) to be next accessed for each of a plurality of queues formed in a common buffer 18 (FIG. 7).

In the input cell write cycle, an unused address is output from the top of the FIFO 104 providing the address queue storing an idle address, and is supplied to the write address memory WARAM 101 and the next address memory 103 respectively as data (next address). The write address memory WARAM 101 has a plurality of record storage positions corresponding to the queue numbers.

Now the write address memory WARAM 101 is addressed by the queue number extracted from the header of the input cell by the PVC allocation circuit, and the next address stored previously is read out from the memory position corresponding to the queue number. Then, the idle address retrieved from the FIFO 104 is stored as the next new address in the same storage position.

The next address memory 103 for storing the idle address (next address) is supplied with the previously-stored next address output from the write address memory WARAM 101 as a write address WA.

The write address WA is used also for writing the input cell to the common buffer 18 shown in FIG. 7. Consequently, pairs of the input cell and the next address are stored in the common buffer memory 18 and the next address memory 103 respectively.

In the case where a cell having the same queue number as the currently-stored cell arrives subsequently, assume that the input cell is written into the common buffer 18 with the next address output from the write address memory WARAM 101 addressed by the queue number as a write address WA. Then, the memory position of the particular input cell in the common buffer coincides with the address stored in the next address memory 103 in a pair with the previous input cell. Thus a list structure is configured in which the cell codes having the same queue number are linked successively by the next address stored in the next address memory.

In the cell read cycle from the common buffer 18, a queue number to be accessed (read) from the bandwidth control table 105 is output in response to the timing supplied from the output timing counter 106.

A valid cell detector 108 includes a plurality of counter areas corresponding to the queue numbers. At the time of writing cell data into a common buffer, the count value of the counter area corresponding to the queue number of the input cell is incremented. At the time of reading the cell data from the common buffer, on the other hand, the count value of the counter area corresponding to the queue number given from the bandwidth control table is checked to decide whether a cell exists in the corresponding queue in the common buffer.

The valid cell detector 108, when supplied with the queue number for a cell to be read out of line L103, if the cell exists in the particular queue, outputs a read enable signal and decrements the count value.

Numeral 102 designates a read address memory (RARAM) having a plurality of storage areas for storing the next read address corresponding to the queue number and outputting the next read address from the storage area corresponding to the queue number designated from line L103 when the read enable signal is a "1".

The read address output from the memory 102 is applied as a read address RA to the common buffer 18 and the next address memory 103 through line L151. As a result, one cell data is read from the queue corresponding to the queue number of the common buffer 18, and in synchronism with it, the next address is read from the next address memory 103.

The next read address is stored in a storage area corresponding to the queue number of the read address memory 102 and provides a read address for next accessing the queue of the same queue number.

The address RA read to line L151 from the read address memory 102 becomes useless and is stored as an unused address in an idle address FIFO 104.

Figure 13:
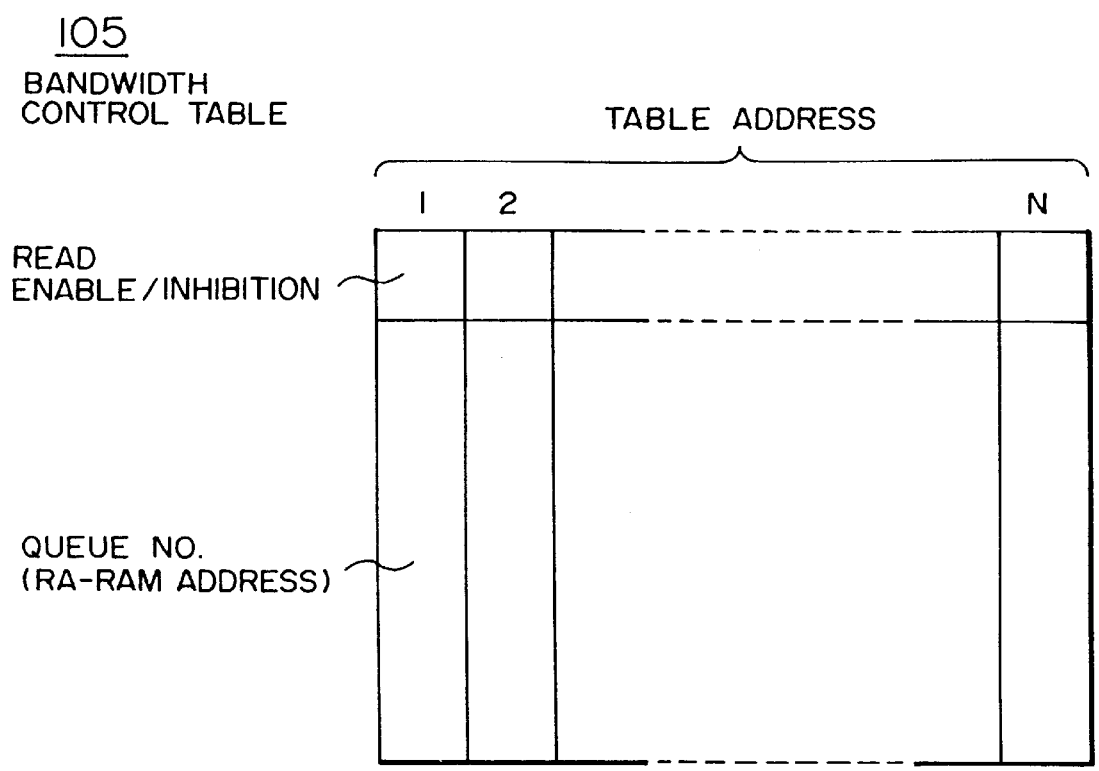
FIG. 13 is a diagram of bandwidth control table shown in FIG. 8 according to an embodiment.

The bandwidth control table 105, as shown in FIG. 13, for example, has record areas in the same number as the output lines (output ports) of the switch 1. The read permit/prohibit information and the queue number information (corresponding to the RARAM address) are stored in the respective record areas.

When the output port number generated in the output timing counter 106 shown in FIG. 8 is applied as an address to the bandwidth control table 105, the read enable/inhibit information and the queue number information are read from the record area corresponding to the output port number. In the case where the read permit/prohibit information is in "prohibit" state, no cells are read from the common buffer.

The contents of the records in the bandwidth control table are set by the controller 3 through the control bus L0.

In the bandwidth control table shown in FIG. 13, assuming that the same queue number is set in at least two record areas designated by different output port numbers. Cells can be output to a plurality of output ports of the switch from the same queue, thus making it possible to output cells at a rate twice or more than from the normal queue.

Conversely, assuming that the number of records in the bandwidth control table is set to four times the number N of output ports, for example, that the output timing counter 106 is caused to generate port numbers 1 to 4N and that the queue number "1" is written only at the first address of the bandwidth control table. The cell of the queue number "1" is read out on the output port 1 once every four times, and therefore cells can be output in one-fourth of the bandwidth.

In this way, the bandwidth control table can control the cell read speed from each queue and thus can control the bandwidth for each queue depending on how the contents thereof are set.

FIG. 9 is a diagram showing the PVC allocation circuit 107 of FIG. 8 according to an embodiment.

A header analysis circuit 131' extracts the contents of the validity indication field, the start indication field, the end indication field, the PVC field and the queue number field from the header of the input cell. In the case where the signal of the validity indication field is a "0" indicating an idle cell, the AND circuit 13*d* outputs a "0" and prohibits the write operation into the common buffer 18.

A used/unused RAM 138' is for storing information on the used/unused state of the burst data for each queue number, and a PVC RAM 139' is for storing the PVC of the burst data in use for each queue number. Also, a PVC/SVC RAM 13*a'* is for designating SVC mode or PVC mode for each queue number.

When SVC mode is designated, the PVC/SVC RAM 13*a'* outputs a "1", causes the OR circuit 13*c* to output a "1", causes the AND circuit 13*d* to output a "1" indicating the presence of a valid cell as a validity indication, and causes the input cell to be written into the common buffer 18. As a result, the PVC allocation circuit 107 does not manage the burst data but performs the cell write operation.

If the designation is PVC mode, on the other hand, the OR 13*c* does not output a "1" unless the output of the AND circuit 133 or 135 is a "1". In this case, therefore, the output of the AND circuit 133 or 135 controls the cell write operation. The mode for the PVC/SVC RAM 13*a'* is set from the controller 3 through the control bus L0 and the microcomputer interface circuit 13*b'*.

Now, explanation will be made about the operation in the case where the PVC/SVC RAM 13*a'* designates the PVC mode with respect to the queue number of the input cell.

When the input cell is the leading cell of the burst data (when start indication is given), assuming that the used/unused RAM 138' outputs a "0" indicating the unused state and that the validity indication is a "1" indicating the presence of a valid cell. Then, the AND circuit 133 outputs a "1".

In the processor on condition that the AND circuit 134 outputs a "0" (the value where the end indication is not set), the AND circuit 136 outputs a "1" and the OR circuit 137 sets the data load LD to a "1". As a result, a "1" indicating the used state of the record area corresponding to the queue number of the input cell is set on the used/unused RAM 138'.

Also, the PVC value output from the header analysis circuit 131' is set in the record area corresponding to the queue number of the input cell in the PVC RAM 139'. Further, the "1" output from the AND circuit 133 causes the AND circuit 13*d* to output a cell write enable signal through the OR circuit 13*c*. This operation permits the PVC to be registered at the time of arrival of the leading cell of the burst data.

In the case where an input cell is the leading cell and the used/unused RAM 138' indicates the used state of the burst data, the output of the used/unused RAM 138' is a "1" and the AND circuit 133 outputs a "0". As a consequence, no value is set in the used/unused RAM 138'. Nor is the operation performed for writing the input cell into the common buffer 18 through the OR circuit 13*c*. In other words, in the case where the output line is already occupied by another burst data at the time of arrival of the leading cell of a given burst data, the PVC of the newly-arriving burst data has the identifier thereof not registered for admission.

Assuming that an input cell is the last cell (with end indication). The AND circuit 134 outputs a "1" in the case where the validity indication is a "1" indicating the presence of a valid cell, the used/unused RAM 138' outputs a "1" indicating the used state, and the output of the matching detector 132 is a "1" indicating that the PVC registered in the PVC RAM 139' coincides with the PVC of the output of the header analysis circuit 131'.

In the processor the AND circuit 136 outputs a "0", and the OR circuit 137 a "1". Therefore, a "0" indicating the unused state is set in the record area corresponding to the queue number of the input cell in the used/unused RAM 138'. As a result, the output line becomes ready for use by other burst data that may arrive.

Assuming that an input cell is a valid cell, the used/unused RAM 138' indicates the used state, and that the value of the PVC RAM 139' coincides with the PVC value of the input cell. The AND circuit 135 outputs a "1", and causes the AND circuit 13*d* to output a write enable signal through the OR circuit 13*c*. As a result of this control, a PVC cell in use which may arrive is admitted.

The PVC allocation circuit shown in FIGS. 5 and 9 is a case in which only one burst data is admitted for each queue. An embodiment will be explained below in which a plurality of burst data are admitted for each queue.

Figure 10:
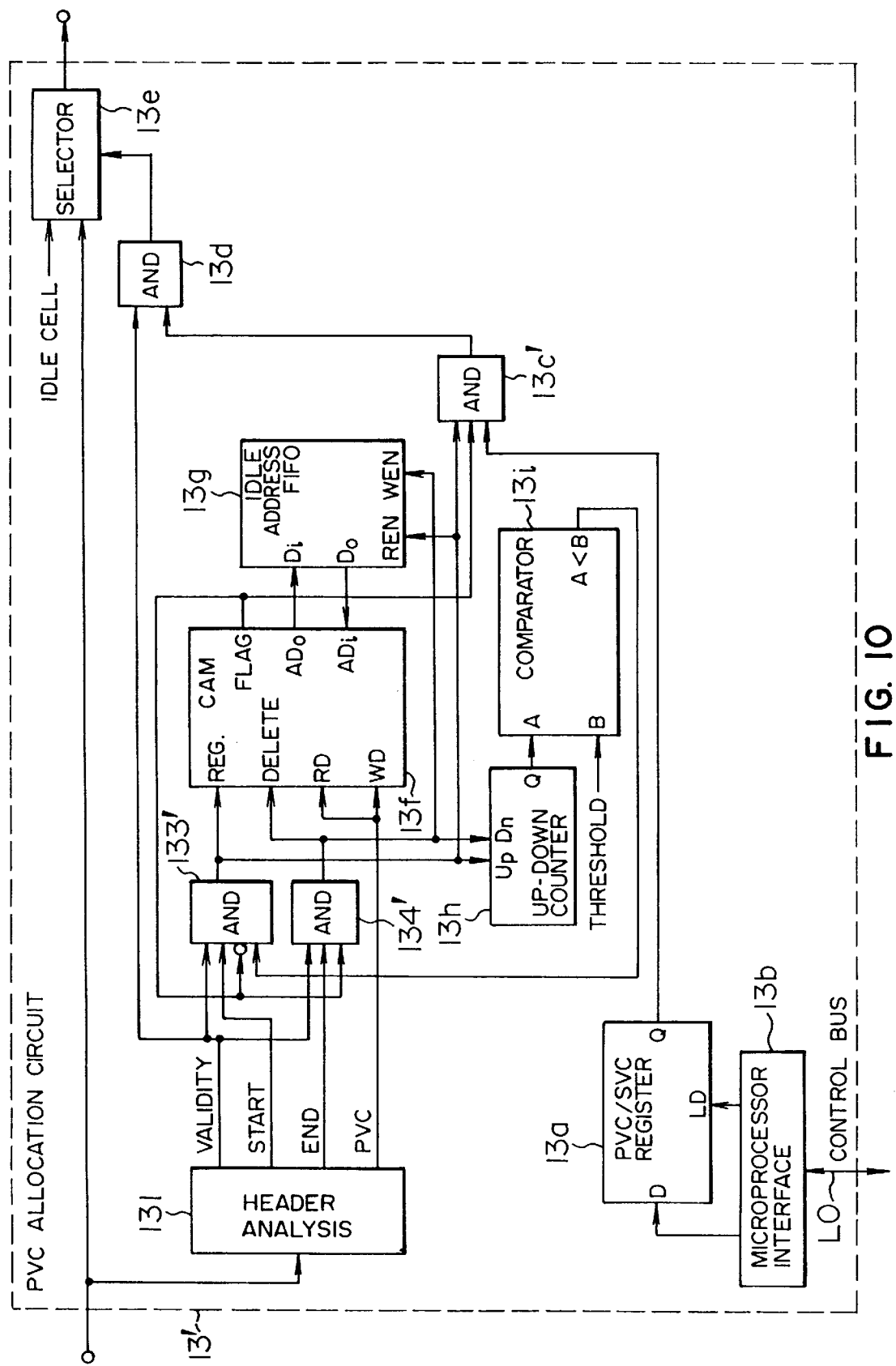
FIG. 10 is a diagram showing the PVC allocation circuit shown in FIG. 3 or 6 according to another embodiment.

FIG. 10 shows a configuration replacing the PVC allocation circuit of FIG. 3 or 6, in which a plurality of burst data can be set for each queue.

The input cell has the validity indication field, the start field, the end field and the PVC field thereof separated and extracted by a header analysis circuit 131. In the case where the validity indication field signal outputs a "0" indicating an idle cell, the AND circuit 13*d* outputs a "0" and causes the selector 13*e* to output an idle cell pattern.

A CAM (Content-Addressable Memory) 13*f* is a memory for registering the PVC of the burst data, and an unused address FIFO 13*g* is for storing the address not used by the CAM 13*f*.

An up-down counter 13*h* is for counting the number of burst data in registration, and a comparator 13*i* for deciding whether the number of burst data in registration has exceeded a predetermined threshold value and holding the number of burst data admitted in each queue below the threshold value.

The PVC/SVC register 13a is for designating the SVC mode or PVC mode of the queue processed by the PVC allocation circuit. In the case where SVC mode is designated, the PVC/SVC register 13a outputs a "1", causes the OR circuit 13c' to output a "1", causes the AND circuit 13d to output a "1" with the validity indication of "1" indicating the presence of a valid cell, and causes the selector 13e to admit the input cell as it is.

As a result, the PVC allocation circuit passes the cell freely without managing the burst data. In the case where the PVC/SVC register 13a designates the PVC mode, on the other hand, the output of the OR circuit 13c' is not a "1" unless the output of the AND circuit 133' or 134' is a "1". In this case, the cell output is controlled according to the output of the AND circuit 133' or 134'. The mode of the PVC/SVC register 13a is set from the controller 3 through the control bus L0 and the microcomputer interface circuit 13b.

Now, explanation will be made about the control operation with the PVC mode designated by the PVC/SVC register 13a.

The PVC extracted by the header analysis circuit 131 at the time of cell arrival is input to the CAM 13f as an address, and the CAM 13f outputs the result of decision whether admission is registered or not corresponding to the input PVC. In the case where the admission is registered, an input cell selection instruction is applied to the selector 13e through the OR circuit 13c' and the AND circuit 13d.

Assuming that an input cell is the leading cell of the burst data (with start indication). The AND circuit 133' outputs a "1" in the case where the CAM 13f outputs a "0" indicating the unused state, the validity indication a "1" indicating the presence of a valid cell and a comparator 13i indicates that the up-down counter 13h is not more than the threshold value.

In the process, the unused address FIFO 13g is caused to generate an address, and the PVC is registered in the same address on the CAM 13f, so that the up-down counter 13h is counted up. Also the output "1" of the AND circuit 133' causes the selector 13e to selectively output the input cell through the OR circuit 13c' and the AND circuit 13d. This operation permits PVC registration at the time of arrival of the leading cell of the burst data.

In the case where an input cell is the leading cell and the value on the up-down counter 13h exceeds the threshold value, the AND circuit 133' outputs a "0". In this case, the PVC is not registered in the CAM 13f and the input cell selection instruction is not issued by the output of the OR circuit 13c'.

This operation indicates that the burst data that has newly arrived is not admitted if a predetermined number of other burst data already occupy the output line at the time of arrival of the leading cell of the newly-arriving burst data, and therefore the PVC registration operation cannot be performed.

Assuming that an input cell is the last cell (with the end indication). In the case where the validity indication is a "1" indicating the presence of a valid cell and the CAM 13f outputs a "1" indicating that the PVC is in registration, the AND circuit 134' outputs a "1".

In the process, the corresponding PVC on the CAM 13f is cancelled, and the address of the record that has so far registered the PVC is stored in the unused address FIFO 13g as an idle address, so that the value on the up-down counter 13h is counted down.

As a consequence, the registered PVC of the burst data that has been admitted is cancelled, and registration becomes possible for new burst data that arrive subsequently.

Assuming that the up-down counter is configured to perform the add operation by a magnitude according to the bandwidth of the burst data at the time of registration of the identification information of the admitted burst data and performs the subtract operation by a magnitude according to the bandwidth of the burst data at the time of cancelling the registration of the identification information. An appropriate admission control becomes possible not exceeding the bandwidth of the output queue for a plurality of burst data having different bandwidths.

In this case, it is necessary to acquire bandwidth information for each burst data. This can be realized by preparing a table indicating the bandwidth values for each PVC or by adding information indicating the bandwidth to the leading cell of the burst data by means of the line interfaces 2-1 to 2-N or the cell-generating terminal equipment.

Figure 11:
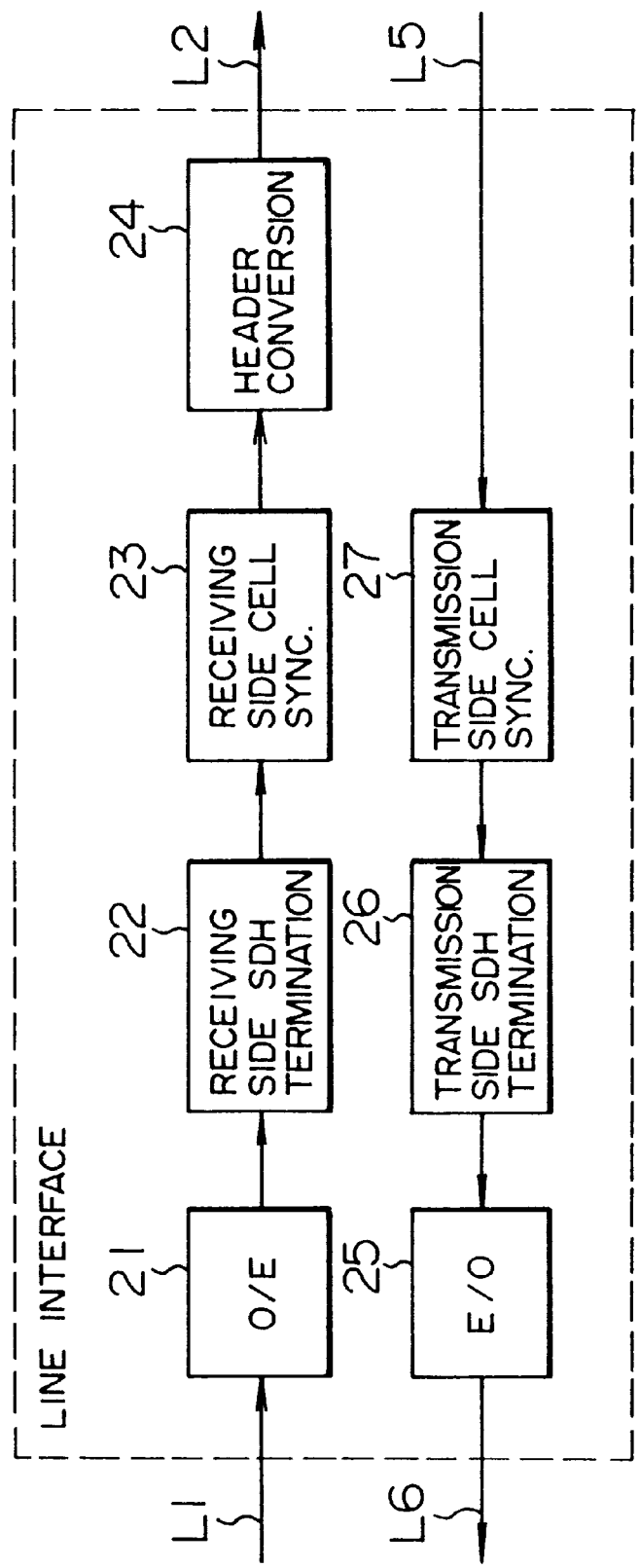
FIG. 11 is a diagram showing a line interface shown in FIG. 1 according to an embodiment.

FIG. 11 is a diagram showing the line interfaces 2-1 to 2-N of the ATM switching system of FIG. 1 according to an embodiment.

The cell input from the line L1 made of an optical fiber, for example, is converted into an electrical signal by an O/E converter 21, and the transmission frame is terminated by a receiving SDH termination circuit 22.

The cell transmitted by the transmission clock is synchronized with the switch-side clock distributed in the ATM switching system at a receiving cell sync circuit 23. The header conversion circuit 24 converts the cell header and attaching the required additional information to the header, outputs the cell to line L2 making up a switch input.

The cell output to line L5 from the switch is synchronized with the propagation-side clock from the state synchronized with the switch-side clock at the transmission-side cell sync circuit 27. A transmission-side SDH termination circuit 26 places the cell on the transmission frame, and the E/O converter 25 converts the electrical signal into an optical signal.

Figure 12:
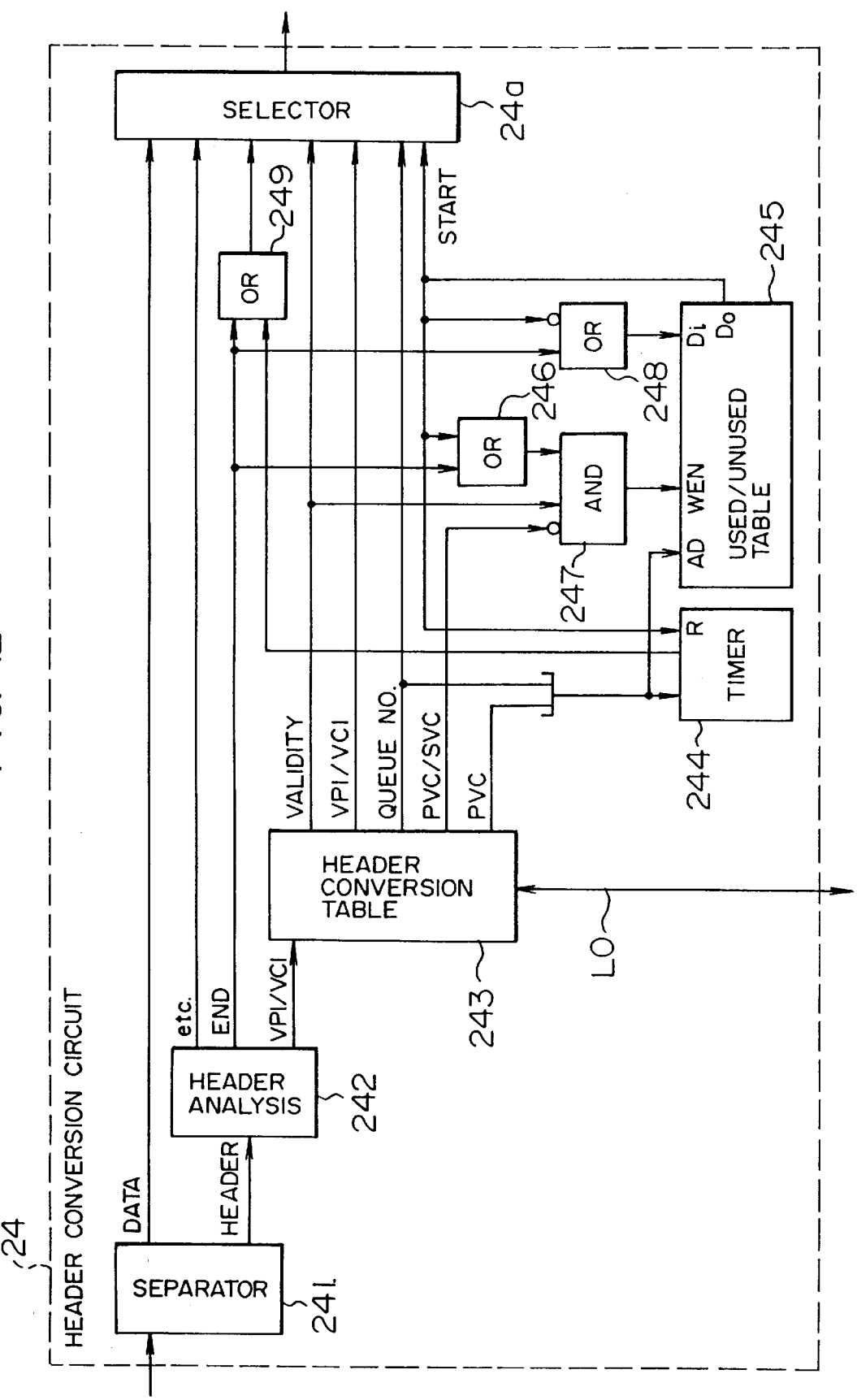
FIG. 12 is a diagram showing the header conversion circuit shown in FIG. 11 according to an embodiment.

FIG. 12 is a diagram showing the header conversion circuit 24 of FIG. 11 according to an embodiment.

The cell input to the header conversion circuit 24 is separated into the data section and the header section by a separator 241, and further separated into the VPI/VCI, end indication and other fields by the header analysis circuit 242.

Generally, in the AAL5 (ATM Adaptation Layer Type 5), the end indication is attached and used indicating the last cell of the burst data.

The header conversion table 243, upon application thereto of the VPI/VCI output from the header analysis circuit 242, outputs a new VPI/VCI together with the validity indication, the output queue number the type of PVC or SVC and the PVC value. The contents of the header conversion table 243 are rewritten by the controller 3 through the control bus L0.

The used/unused table 245 is a table for holding the information as to whether the output line is occupied or not by the burst data for each queue according to the PVC.

Assuming that the validity indication signal is a "1" indicating a valid cell and the PVC/SVC type signal is a "0" indicating PVC mode. In the case where the information output from the used/unused table 245 is a "1" indicating the unused state, this output is applied as a start indication to the selector 24a, while at the same time causing the output value of the OR circuit 248 to be written in the record area in the used/unused table 245 corresponding to the queue number and the PVC of an arriving cell through the OR circuit 246 and the AND circuit 247.

In this case, the output value of the OR circuit 248 is a "0" indicating the used state unless the end indication is a "1". In the write operation, therefore, information indicating the used state is set in the used/unused table 245. The header of the leading cell of the burst data has attached thereto a bit pattern indicating the start indication.

Assuming that the end indication representing the last cell is output from the header analysis circuit 242 when the validity indication is a "1" indicating a valid cell and the PVC/SVC type is a "0" indicating PVC mode. The output value of the OR circuit 248 is written in the record area of the used/unused table 245 corresponding to the queue number and the PVC of the arriving cell through the OR circuit 246 and the AND circuit 247. In the process, the output value of the OR circuit 248 is a "1" indicating the unused state, so that the information registered in the used/unused table 245 is cancelled.

A timer 244 is provided for invoking the end indication forcibly against cell admission of given burst data and cancelling the PVC registration in the case where the particular burst data occupies a queue for longer than a predetermined length of time unfairly interfering with the admission of other burst data.

With the arrival of the leading cell of burst data, the start indication (unused indication) is output from the used/unused table and a value corresponding to the queue number and the VPI/VCI is reset in the timer 244. The timer 244 updates the timer value with the progress of time and when a predetermined value is exceeded, outputs a "1" to the OR circuit 249, thereby causing the OR circuit 249 to output a control signal "1" indicating the end indication.

The selector 24a selects the validity indication, the start indication, the end indication, the queue number, the VPI/VCI, other part or data of the header as required. A cell format for the switch is thus constructed and output.

The header conversion circuit 24 shown above adds the start indication to the leading cell of the burst data and at the same time has the function of terminating the cell transfer operation forcibly against the burst data occupying a queue for a long time.

As obvious from the foregoing embodiments, according to this invention, availability of a bandwidth room is checked for each output queue of the ATM switch to pass a given burst data at the time of arrival of the leading cell of the particular burst data. In the case where the bandwidth has a room, the burst data is admitted, while in the case where the bandwidth has no room, the cells of the burst data are all discarded. As a result, even when a plurality of burst data exceeding the limit of bandwidth arrive at a specific output line of the ATM switch in temporally overlapped fashion, all the cells of the burst data not admitted are discarded, while the cells of the burst data for which the bandwidth has been secured are positively transferred without being discarded due to buffer overflow.

We claim:

1. An ATM apparatus for use in an ATM communication network on which a plurality of virtual connections are formed and burst data is transmitted via one of said virtual connections in a form of a plurality of ATM cells each having header information specifying a virtual connection thereof, said ATM apparatus comprising:

a buffer memory in which ATM cells belonging to different virtual connections are stored temporarily; and a control circuit provided to analyze header information of respective ATM cells arriving at the ATM apparatus and to discard a series of ATM cells belonging to a newly arrived burst data before storing in the buffer memory if said buffer memory is in a busy state and cannot accept the ATM cells of the newly arrived burst data when header information of a first ATM cell of the newly arrived burst data is analyzed, thereby preventing said buffer memory from congestion while fully passing ATM cells belonging to another burst data having been admitted.

2. An ATM apparatus according to claim 1, further comprising:

a buffer controller coupled to said buffer memory and said control circuit so as to store said ATM cells in said buffer memory in such a manner that a plurality of output queues corresponding to the virtual connections of the ATM cells are formed, wherein said control circuit selects one of pass and discard of said series of ATM cells belonging to the newly arrived burst data by judging whether an output queue corresponding to the newly arrived burst data is in a busy state.

3. An ATM apparatus according to claim 1, further comprising:

a plurality of input ports through which the ATM cells are provided to the ATM apparatus; and a plurality of output ports to which ATM cells stored in the buffer memory are selectively read out by said buffer controller, each of said output ports being associated with at least one of said output queues formed in the buffer memory.

4. An ATM apparatus according to claim 3, wherein at least one of said output ports is associated with both of a first output port storing ATM cells having a switch virtual connection mode and a second output port storing ATM cells having a permanent virtual connection mode.

5. An ATM apparatus for use in an ATM communication network on which a plurality of virtual connections are formed and burst data is transmitted via one of said virtual connections in a form of a plurality of ATM cells each having header information specifying a virtual connection thereof, said ATM apparatus, comprising:

a buffer memory in which ATM cells belonging to different virtual connections are stored forming a plurality of output queues; and a burst cell control circuit coupled to said buffer memory to discard a series of ATM cells beginning from a first ATM cell of a new burst data by detecting boundaries of the respective burst data coming into the ATM apparatus to prevent said buffer memory from congestion and to fully pass the other ATM cells which include ATM cells belonging to at least one preceding burst data which has been permitted to enter the buffer memory before a first ATM cell of said new burst data arrives at the ATM apparatus.

6. An ATM apparatus according to claim 5, further comprising:

a plurality of input lines through which the ATM cells are provided to the ATM apparatus;

wherein said burst cell control circuit is located in each of said input lines so that a reduced number of ATM cells are supplied to said buffer memory.

7. An ATM apparatus according to claim 5, further comprising:

a plurality of input ports through which the ATM cells are provided to the ATM apparatus; and a plurality of output ports to which ATM cells stored in the buffer memory are selectively delivered, each of said output ports being associated with at least one of said output queues formed in the buffer memory, wherein said burst control circuit decides to discard ATM cells of the new burst data when one of said output queues corresponding to the new burst data is in a competing state with a preceding burst data.

* * * * *